United States Patent
Zhang et al.

(10) Patent No.: US 7,447,836 B2
(45) Date of Patent: Nov. 4, 2008

(54) DISK DRIVE STORAGE DEFRAGMENTATION SYSTEM

(75) Inventors: Ji Zhang, Monte Sereno, CA (US); Hain-Ching Liu, Fremont, CA (US); Jiangang Ding, San Jose, CA (US)

(73) Assignee: Software Site Applications, Limited Liability Company, Wilmington, DE (US)

( * ) Notice: Subject to any disclaimer, the term of this patent is extended or adjusted under 35 U.S.C. 154(b) by 248 days.

(21) Appl. No.: 11/353,370

(22) Filed: Feb. 14, 2006

(65) Prior Publication Data

US 2007/0198614 A1    Aug. 23, 2007

(51) Int. Cl.
G06F 12/00    (2006.01)

(52) U.S. Cl. ...................................... 711/113

(58) Field of Classification Search ................. 711/113, 711/165
See application file for complete search history.

(56) References Cited

U.S. PATENT DOCUMENTS

| 5,463,776 A | 10/1995 | Voigt et al. |
| 6,202,124 B1 | 3/2001 | Kern et al. |
| 6,694,381 B1 * | 2/2004 | Lo et al. ........................ 710/5 |
| 6,745,310 B2 | 6/2004 | Chow et al. |
| 6,978,283 B1 | 12/2005 | Edwards et al. |
| 2003/0101383 A1 * | 5/2003 | Carlson ........................ 714/42 |
| 2005/0228963 A1 | 10/2005 | Rothman et al. |

* cited by examiner

*Primary Examiner*—Hiep T Nguyen
(74) *Attorney, Agent, or Firm*—Stolowitz Ford Cowger LLP

(57) ABSTRACT

The present invention provides a disk drive storage defragmentation system, comprising providing a cache buffer system coupled to a host system, coupling a disk drive storage system to the cache buffer system, performing a defragmantation process on the disk drive storage system utilizing the cache buffer system and servicing a data access request by the host system from the cache buffer system.

19 Claims, 5 Drawing Sheets

DISK DRIVE STORAGE DEFRAGMENTATION SYSTEM

TECHNICAL FIELD

The present invention relates generally to disk drive storage systems, and more particularly to a system for defragmentation of file systems on disk drive storage systems.

BACKGROUND ART

Disk drive based storage systems are widely used for storing digital data of all kinds, such as computer data and multimedia data (voice, video and image). In storage systems, one or more disk drives are configured to provide storage of data content. The disk drives can be read from or written to. Data can be stored and modified on the disk drives via the computer host bus controllers. Before data is stored onto storage systems, it must be organized in logic units, called data files, such as video files, image files, database files, etc. Such organization is typically handled by the operating systems of the computer system that hosts the data files.

In general disk storage system can not hold data without a file system, rather it holds physical arrays of unspecified data blocks. A file system is a data structure layer implemented as part of the operating system. It defines how the computer interfaces with the attached disk storage, be it directly attached or attached through a network interface cable. The file system defines how the data is organized and located on the disk drives, file ownership and quotas, date of creation and change, and any recovery information associated with the file. The file system is the critical link between the logic data files and the physical disk drive storage systems. It not only manages the data files but also maps the files to the disk drive storage system.

To write a file to the disk storage, a sufficient number of data sectors must first be allocated. This operation is performed by the file system and lower level device driver programs. Preferably all of the data of a file is stored on a single track and in consecutive data sectors. In this way, data is accessed continuously without moving the disk actuator.

However as host computers typically add and delete data files, causing allocated data blocks be freed and then allocated for a different file, possibly of different file size, the disk actuator must be moved from track to track. The times required for the movement of the disk actuator between two tracks on the disk drive platter, in order to gain access to data on different tracks, is called random seek latency. During this latency, no data access is possible, therefore, it is preferred to have a seek latency as short as possible and preferred to have the number of seek activities as low as possible.

As the file system stores and updates files on the disk drive, available contiguous data blocks become difficult to locate. If a file is larger than the available contiguous data blocks, the file is fragmented and stored wherever the available blocks can accommodate it. In order to read or write the entire file, the disk drive actuator is moved to the track containing the first file segment. When the data for the first file segment is completed, a seek operation is performed to get to the track holding the second file segment. The seek operation can take anywhere from 1 millisecond (mS) to 20 mS. A standard 3.5" disk drive platter rotating at 7200 RPM will make one revolution in 139 microseconds (µS). During the shortest seek, the disk drive platter will complete 7.2 revolutions. The longest seek will allow the disk to complete 143 revolutions just to get to the track that contains the requested data. The average seek time on a 3.5" disk drive is approximately 8 mS, meaning the disk drive platter will complete 57 revolutions, on average, every time the disk drive actuator is moved.

An example of a file fragmented into five segments, would require a seek operation between each block. In order to retrieve the data for a read of this file, a total of 228 revolutions of the disk drive platter are wasted with no data retrieved during the seek operations. This can devastate the performance of the disk drive storage system. The fragmentation of the files on the disk drive will impact the performance of the host computer as processes await the requested file.

As the host computer repeatedly performs the above file operations over long periods of time, and as the file system starts to get full, i.e., most of the data sectors on the disk drive platters will be allocated to stored files, allocating new data blocks becomes increasingly difficult. Specifically, a file system may need to allocate data sectors in physically scattered locations in order to store the data from a single file. Since the host computer accesses a file as a single data entity, the file system must gather all of the data blocks associated with a specific file when such a file access request is issued by the host computer. This requires that the disk drive actuator move to read data sectors from different locations on the disk drive platter, resulting in random seek latencies. The problem of a single data file being stored in scattered locations is called file system fragmentation. A fragmented file system causes an excessive amount of random seeks to access file space allocated for write and read.

For real-time applications, the storage I/O access throughput requirements, i.e., the transfer rate between the disk drive storage device and other devices connected to it, are usually high. The I/O throughput requirements are also getting higher as applications get more advanced. For example, a high-definition television signal, when in uncompressed format, can require as high as 186 megabytes per second (MBps) access throughput. For digital film production, the storage I/O throughput can be as high as 1.2 gigabyte per second (GBps). More importantly, the data transfer to the storage device must be performed isochronously, i.e., with timing constraints. This poses a substantial challenge to the disk drive technology.

Disk drives can deliver very high data throughput as long as random seeks are reduced to a minimum. With fragmented file systems, a substantial amount of random seeking and latencies may be introduced due to file fragmentation. This can significantly reduce the data throughput, often to a level below what is required to support real-time applications such as high-definition video and digital film production. In general, by storing all of the data blocks associated with a given file consecutively on a disk platter, fragmentation could be reduced or eliminated. This goal can not be achieved without taking up additional host computer resources. Specifically, as the file system gets full, or as the file system gets an increasing amount of file write and delete operations, the fragmentation will reach a level that the host computer typically will initiate a processing task called defragmentation.

In a defragmentation process, the data blocks are re-arranged on the disk drives so that the data blocks of the same file can be accessed with the fewest number of random seeks. The defragmentation program will move the data blocks of a given file to be on the same data track or in the same general region. However, the defragmentation process requires extra processing and data transfers. The host computer must decide, via the file system, which data is moved to which location to minimize resulting fragmentation. The objective is to reduce or eliminate the fragmentation of files. Many of today's operation systems have defragmentation programs, and some prefer to run the defragmentation in the background at a lower priority than application file accesses. During this process, some free data blocks may be used as a temporary hold place for fragmented data blocks. Sometimes, if the disk drive device is almost full with user data blocks, there may not be enough available free data blocks to hold the defragmented files. This means that certain fragmented data blocks may need to be copied multiple times within the disk drive to move them to the desired and defragmented locations. As a result, the overall data access throughput is further reduced due to the defragmentation process, defeating the original purpose which is to improve the storage system performance.

Thus, a need still remains for a system to manage the amount of fragmentation a file system is subjected to. In view of the throughput demand generated by new applications, it is increasingly critical that answers be found to these problems. Solutions to these problems have been long sought but prior developments have not taught or suggested any solutions and, thus, solutions to these problems have long eluded those skilled in the art.

DISCLOSURE OF THE INVENTION

The present invention provides a disk drive storage defragmentation system, comprising providing a cache buffer system coupled to a host system, coupling a disk drive storage system to the cache buffer system, performing a defragmantation process on the disk drive storage system utilizing the cache buffer system and servicing a data access request by the host system from the cache buffer system.

Certain embodiments of the invention have other aspects in addition to or in place of those mentioned or obvious from the above. The aspects will become apparent to those skilled in the art from a reading of the following detailed description when taken with reference to the accompanying drawings.

BEST MODE FOR CARRYING OUT THE INVENTION

Figure 1:
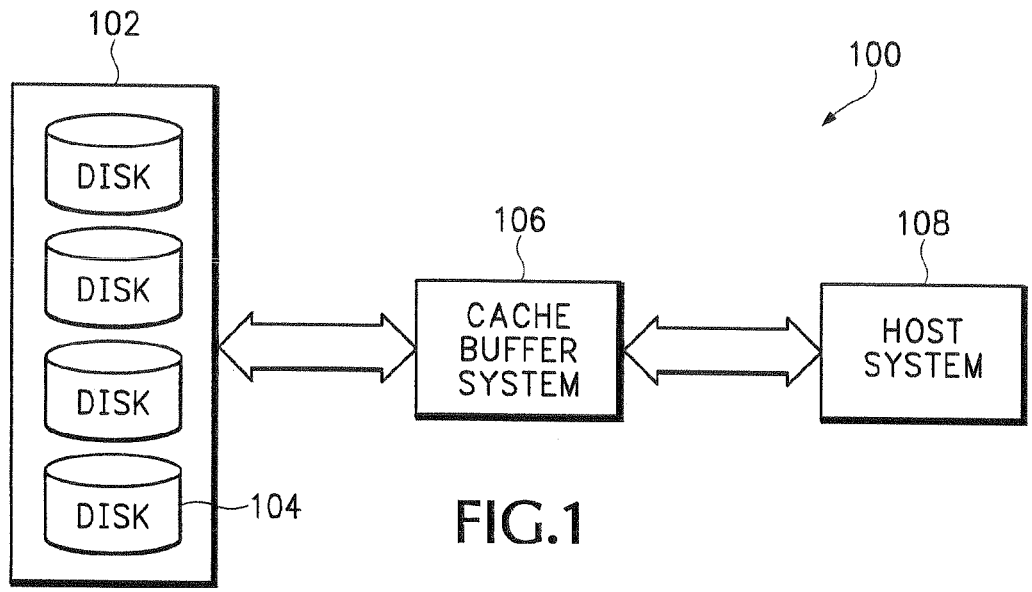
FIG. 1 is a block diagram of a disk drive storage defragmentation system in an embodiment of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail. Likewise, the drawings showing embodiments of the apparatus/device are semi-diagrammatic and not to scale and, particularly, some of the dimensions are for the clarity of presentation and are shown greatly exaggerated in the drawing FIGS. The same numbers are used in all the drawing FIGS. to relate to the same elements.

Referring now to FIG. 1, therein is shown a block diagram of a disk drive storage defragmentation system 100 in an embodiment of the present invention. The block diagram of the disk drive storage defragmentation system 100 depicts a disk drive storage system 102, having multiple instances of a storage disk 104, a cache buffer system 106 and a host system 108. The host system 108 could be a single end user system or a data server that supplies user data to a vast network of end user systems. The cache buffer system 106 is an intermediary device between the host system 108 and the disk drive storage system 102.

The cache buffer system 106 utilizes a large random access memory which is generally large enough to hold the entire one or more data files, such as up to a one terabyte memory or larger, to organize the data sent to the disk drive storage system 102. The cache buffer system 106 can actually manage the data written to an instance of the storage disk 104 in order to minimize the fragmentation that occurs in normal operation. If there is no contiguous segment of free blocks large enough to hold the file to be stored in contiguous fashion, the data can remain in the cache buffer system 106 until a large enough available storage segment is identified rather than fragmenting the file into several dissociated locations on the storage disk 104. Sometimes in order to ensure that no data loss occurs, the fragmented data file segments are stored on the disk storage while all read requests are served directly out of the cached copy within the cache buffer. If the same data is requested from a read operation, the data can be transferred directly from the cache buffer system 106.

The cache buffer system 106 stores a copy of the meta data, from the host system 108, in order to maintain a valid map of the location of all files stored on the storage disk 104. The meta data is maintained by the operating system and contains file level information such as the location, size, creation date, ownership, quota, etc. The meta data must remain synchronized between the host system 108 and the cache buffer system 106. Without the synchronization of the meta data, the file system would become corrupted and user data would be lost. The critical nature of the meta data requires that a single version of the data be kept completely up to date. In order to facilitate this, the cache buffer system 106 maintains the copy of the meta data file that can be accessed by the host system 108 and will be modified whenever the host system copy of the meta data file is modified.

Figure 2:
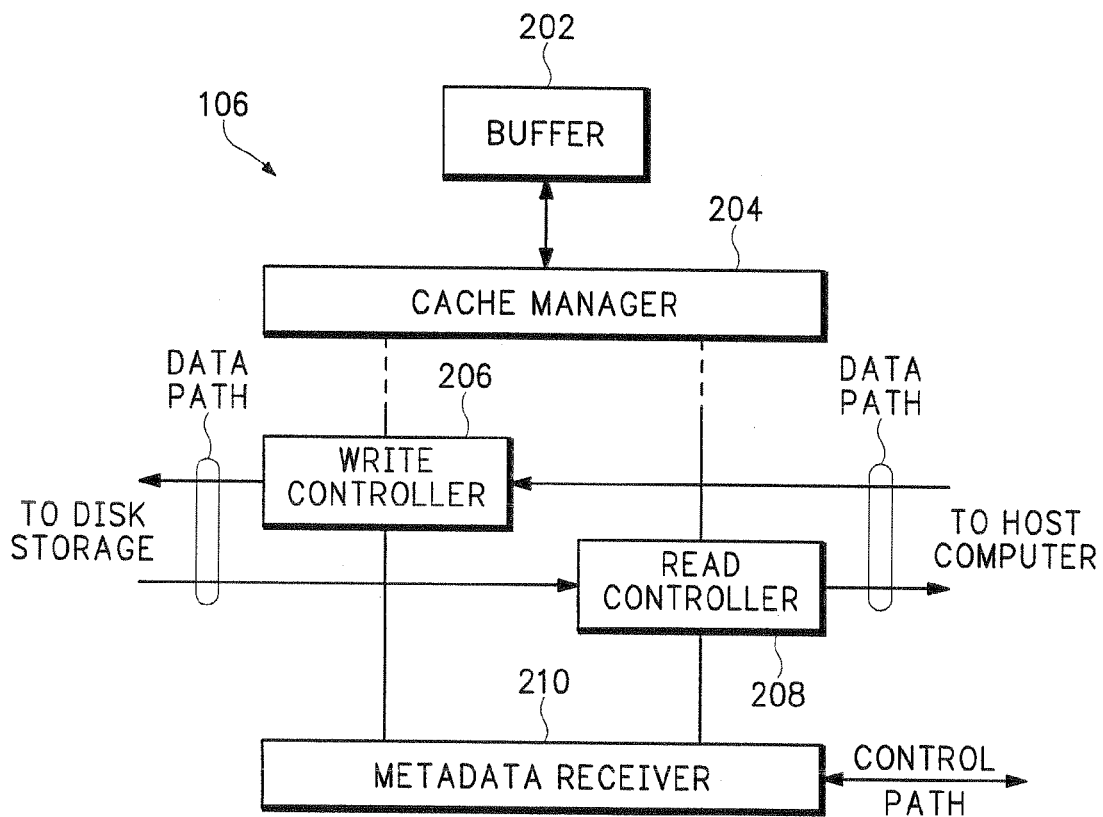
FIG. 2 is a disk system block diagram of the cache buffer system, of FIG. 1.

Referring now to FIG. 2, therein is shown a system block diagram of the cache buffer system 106, of FIG. 1. The system block diagram of the cache buffer system 106 depicts a buffer 202, under the control of a cache manager 204, a write controller 206, a read controller 208 and a meta data receiver 210. The buffer 202 is made up of an array of memory chips, such as DDR RAM. The buffer 202 may contain a large amount of memory, such as a terabyte or more. The buffer 202 is controlled by the cache manager 204. The meta data receiver 210 is the repository for the copy of the file system meta data. This data can be either an integral part of the file system, in which case, it is stored together with the file data, or it can be stored on a separate meta data server, such as the case with some shared file systems. The meta data is the file system's map to the physical location of all of the files stored in the disk drive storage system 102, of FIG. 1.

The cache manager 204 determines what data will remain in the buffer 202 and whether that data should be written to the storage disk 104, of FIG. 1. If a read command is received from the host system 108, of FIG. 1, the cache manager 204 will determine if the requested data is located in the buffer 202. If all of the data or the initial segments reside in the buffer 202, the cache manager 204 will enable the read controller 208 to start the transfer from the buffer 202 to the host system 108. The read controller 208 also reads the meta data from the meta data receiver 210. If the file is fragmented, the read controller 208 may communicate to the cache manager 204 to save a copy of the data as well. This copy of the data can be written back to the storage disk 104, in an area of contiguous free blocks at a later time and then delete the fragmented copy, thus eliminating the fragmentation of the file.

When the host system 108, issues a write command, the write controller 206 activates the path to the cache manager 204 so the data can be copied to the buffer 202 first. While the data is being buffered, the file system allocates the disk storage segments so that the file can be stored in the disk storage and create entries in the meta data file allocation table. Keep in mind that at this time, the actual data file is still in the cache buffer. The modified meta data is also copied into the meta data receiver. After that the write controller 206 interrogates the file allocation table in the meta data receiver 210. If the circuitry within the write controller 206 determines that the file is fragmented, it may elect to defer the write to the storage disk 104, and keep the data in the buffer 202. Further accesses of this data by the host system 108, are directed to the cache manager 204. The write controller 206 works with the cache manager 204 in order to identify an area where the file can be written in contiguous data blocks on the storage disk 104. Once such an area is identified, the cached data is copied back to the storage disk 104, preferably at a time when other activity level is low. This deferred write capability has a significant impact on reducing the fragmentation of the storage disk 104.

A way to deal with the risk of power failure is to allow the data write back to the storage disk 104 even if the allocated disk space is segmented, resulting in fragmented file storage. The cached copy of the data remains in the buffer 202, therefore, the file fragments on the storage disk 104 will not be read. The cached data will be read, while the file fragments stored on the storage disk 104 function as backup copy of the data file in the buffer 202.

The cache manager 204 takes an active part in the defragmentation process as well. If an instance of the storage disk 104, becomes too fragmented, the host system 108, can initiate a defragmentation process. In a two step operation, the cache manager 204 may instruct the read controller 208 to read the entire content of the storage disk 104, and store it in the buffer 202. The data could be reordered in the buffer 202 and the cache manager 204 may instruct the write controller 206 to write the newly ordered data back to the storage disk 104. Or more preferably the data may be in the buffer 202 in the same layout as it appears in the disk sectors, and be reordered as it's written back to the storage disk. The random access nature of the buffer 202 enables out-of-order read from the buffer 202 for in-order write to the storage disk 104.

If a read request is received by the read controller 208 to access data that is involved in the defragmentation process, the cache manager 204 enables the transfer from the buffer 202. In this fashion, the defragmentation process does not degrade the performance of the disk drive storage system 102. Any transaction that is serviced from the buffer 202 by the cache manager 204 will execute much faster than retrieving the data from the storage disk 104. The buffer 202 can access the data approximately 1000 times faster than the storage disk 104. A read request of a fragmented file on the storage disk 104, will be detected by the circuitry of the read controller 208. The data will be transferred from the storage disk 104 to the buffer 202 and the host system 108. The read controller 208 activates a status register within the cache manager 204 indicating the fragmented file should be written back to the storage disk 104 in contiguous free data blocks at a later time.

If the buffer 202 does not have enough available space to copy the entire contents of the fragmented instance of the storage disk 104, the defragmentation process proceeds with the cache manager 204 examining the meta data to determine the location of all of the file fragments. The strategy of the defragmentation process is to create large contiguous free blocks on the storage disk 104. In order to facilitate this goal, file fragments that reside between free contiguous blocks are moved first. The file fragments are transferred to the buffer 202 by the cache manager 204. This creates a larger contiguous section of free blocks. For data reliability purposes, the relocated data fragment should be stored back to the storage disk 104 before the original fragment is deleted. If the buffer 202 is assumed to be reliable, the fragment can remain in the buffer 202 even after the original copy of the fragment has been deleted from the storage disk 104.

The criteria used to identify the target file fragment is related by the size of the file fragment, $\beta$, and the size of the two neighboring free blocks, $F_1$ and $F_2$. The fragment presenting the smallest ratio R of the output of equation 1 is the first candidate to move.

$$R=\beta(F_1+F_2)\div(F_1 \times F_2) \quad (1)$$

Another way to put the above expression is:

$$R=\beta(1/F_1+1/F_2) \quad (2)$$

Essentially what this means is that smaller fragments get relocated first, fragments with larger contiguous neighboring free blocks are relocated first. Therefore, the above expression is only one of many possible ways to make this selection. For example, just for the sake of argument, another way to make the selection would be:

$$R=\beta(1/F_1^2+1/F_2^2) \quad (3)$$

This would make similar choices with somewhat different weight on beta, F1 and F2. In this example, more weight, or sensitivity, is assigned to the values of F1 and F2 than to beta. So we need to point out that the selection criteria above are for illustration purposes only.

The preferred criteria will select the smallest fragments that will liberate the largest contiguous free block space. The criteria favors cases where both $F_1$ and $F_2$ are close in size and both are large. It also favors cases where the relative size of the free blocks, $F_1$ and $F_2$, are larger than the file fragment, $\beta$. The goal of the criteria is to generate as much free contiguous space as possible with the least amount of data moved. The circuitry within the cache manager 204 implements this algorithm in order to determine which file fragments should be relocated.

The file fragments identified by the criteria are moved into the buffer 202 under control of the cache manager 204 and executed by the read controller 208. By selecting the smallest file fragments to relocate into the buffer 202, the cache manager 204 can manage a higher number of fragmented files. As the number of contiguous free blocks increases and the fragmented files are assembled in the buffer 202, the cache manager 204 starts to restore the files on the storage disk 104. The selection and transfer process continues until all of the fragmented files have been restored in contiguous space on the storage disk 104. During the defragmentation process any read or write operations to files held in the buffer 202, are executed by the cache manager 204 without accessing the storage disk 104.

The cache manager 204 updates the meta data in the meta data receiver 210 as files are moved. If the host system 108, requests access to a specific file, the meta data receiver 210 utilizes the updated meta data to set-up the transfer. If the data resides in the buffer 202 the cache manager 204 will notify the meta data receiver 210 that the data access can commence to the buffer 202. The meta data receiver 210 then passes the file location information to the write controller 206 or the read controller 208 depending on the type of access requested.

Figure 3:
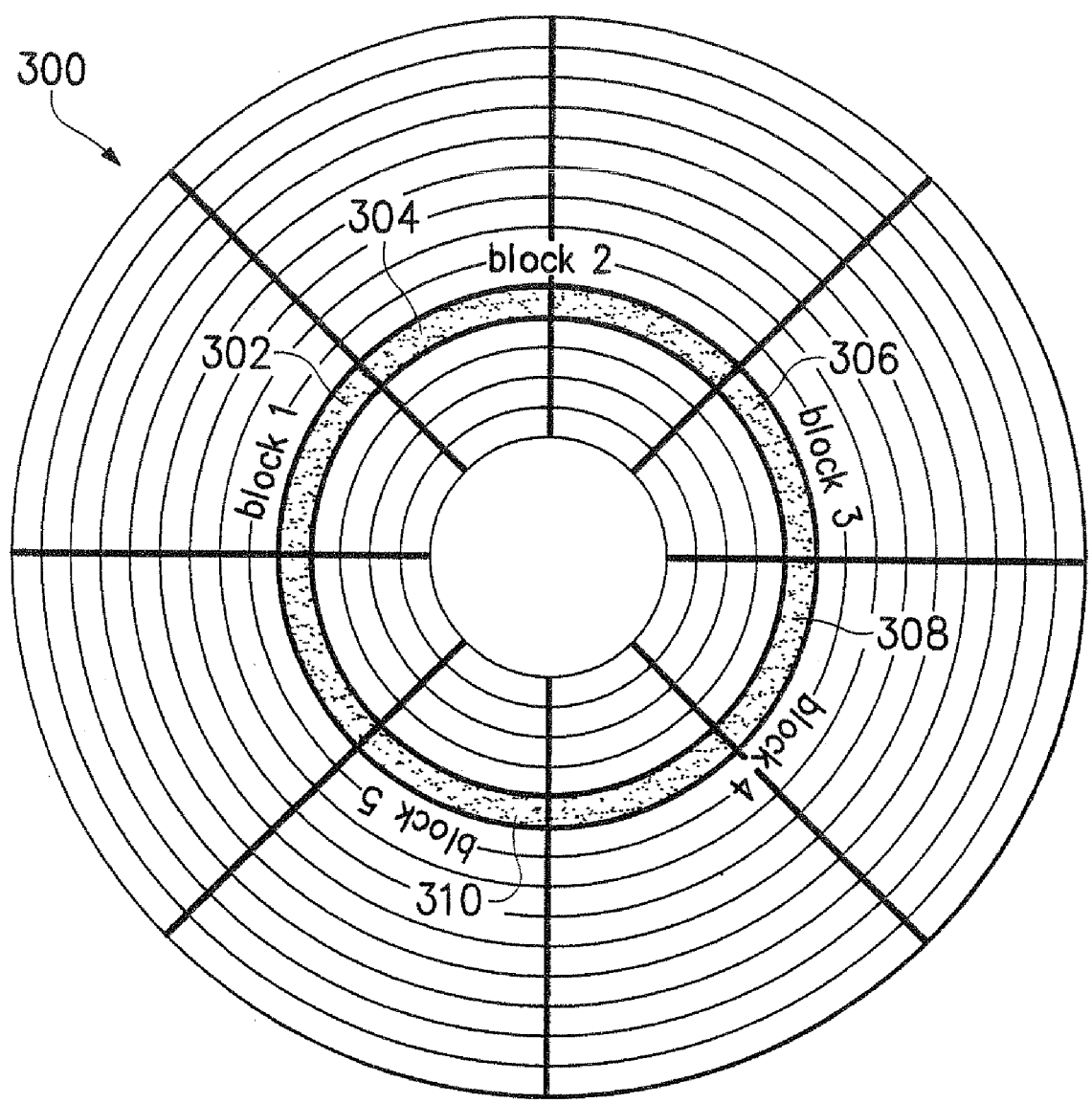
FIG. 3 is a disk block diagram of a file in a defragmantation process.

Referring now to FIG. 3, therein is shown a disk block diagram 300 of a file in a defragmantation process. The disk block diagram 300 depicts the resultant location of the once fragmented segments of the file. The file fragments have been restored in a contiguous format on the storage disk 104, of FIG. 1. The file can be accessed in one revolution of the disk without seek latency after the defragmantation process, where it took 228 revolutions to access the file in the previous fragmented state. In the defragmented state, the first block 302 is adjacent to the second block 304, which is adjacent to the third block 306, which is adjacent to the fourth block 308 which is adjacent to the fifth block 310.

Figure 4:
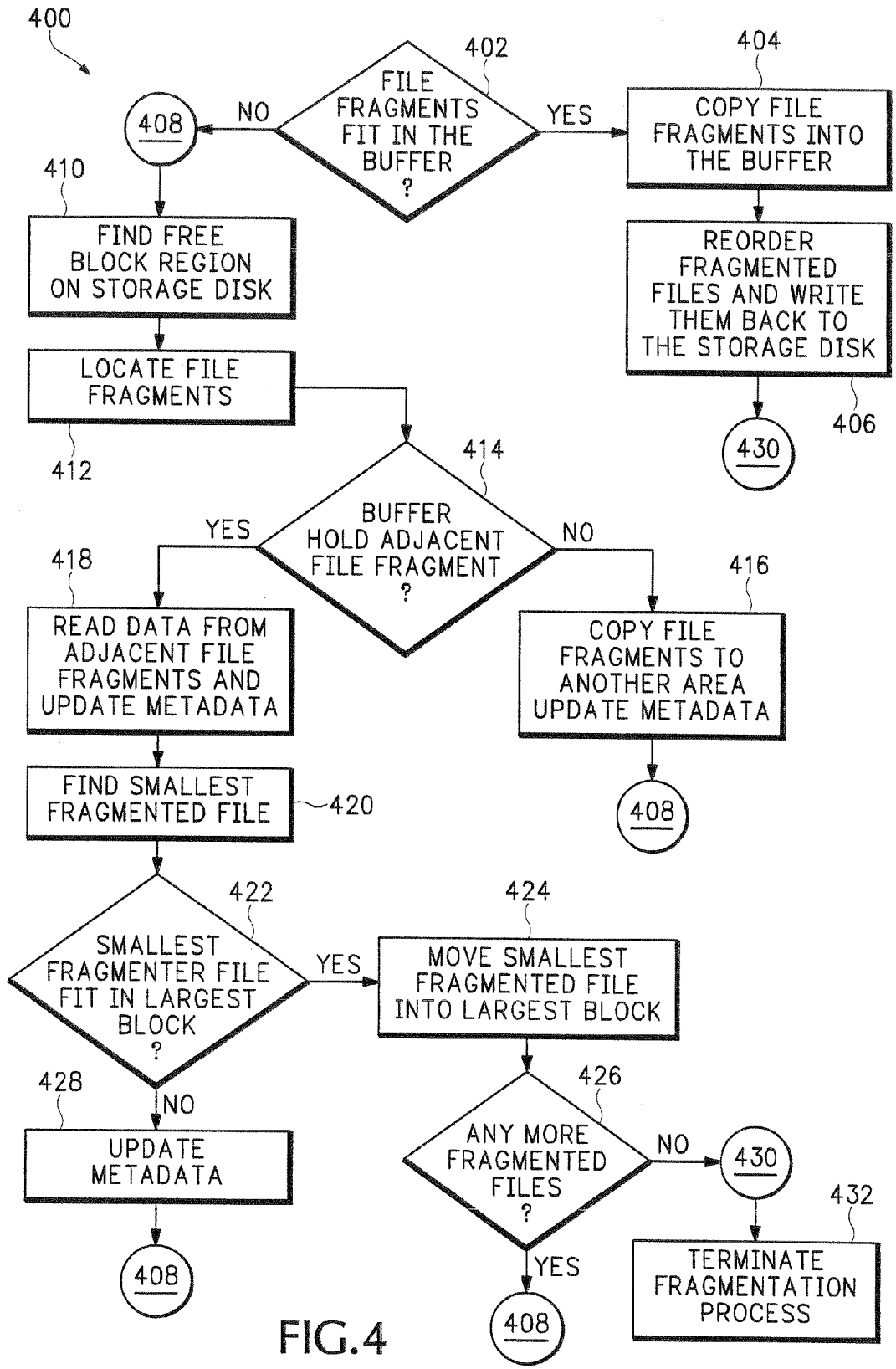
FIG. 4 is a flow chart of a defragmentation process, in an embodiment of the present invention.

Referring now to FIG. 4, therein is shown a flowchart 400 of the defragmentation process, in an embodiment of the present invention. The flowchart 400 depicts the logical process flow used by the cache manager 204, of FIG. 2. A first decision block 402 tests the meta data to determine whether all the file fragments on the storage disk 104, of FIG. 1, will fit in the buffer 202, of FIG. 2. If all the file fragments will fit in the buffer 202, a copy block 404 performs the copy of all the file fragments into the buffer 202. A restore block 406 reorders the fragmented files and writes them back to the storage disk 104, in contiguous data blocks and updates the meta data. At the completion of the restore block 406, a first transition 430 takes the process to an end block 432 to terminate the defragmentation process.

If the first decision block 402 determines that all of the file fragments will not fit in the buffer 202, a second transition 408 takes the process to a find free block 410. The find free block 410 examines the meta data to locate a largest contiguous free block region on the storage disk 104. Having found the largest contiguous free block, the process moves to an adjacent fragments block 412 locates file fragments that are adjacent to the previously identified free block region. A second decision block 414 tests to determine whether the buffer 202, can hold all of the adjacent file fragments. If the buffer 202, can not hold the identified adjacent file fragments, a move file fragments block 416 copies the file fragments to another area of free blocks on the storage disk 104, and updates the meta data. At the completion of the move file fragments block 416, the process enters the second transition 408 for another attempt.

If the buffer 202, can hold all of the adjacent file fragments, a move to buffer block 418 reads the data from the adjacent file fragments into the buffer 202 and frees the data blocks that held the adjacent file fragments and updates the meta data, thus increasing the size of the largest contiguous free block region. The next process step is a find smallest block 420 searches the meta data for the smallest fragmented file on the storage disk 104. A third decision block 422 tests to determine whether the smallest fragmented file will fit into the largest contiguous free block region. If the smallest fragmented file will fit into the largest contiguous free block region, a copy smallest block 424 moves the smallest fragmented file from its diverse locations into the largest contiguous free block region as a complete and contiguous file, and updates the meta data. At the completion of the copy smallest block 424, a fourth decision block 426 examines the meta data to determine if there are any more fragmented files on the storage disk 104. If there are not any more fragmented files on the storage disk 104, the first transition 430 takes the process to the end block 432 to terminate the defragmentation process. If the fourth decision block 426 determines that there are additional fragmented files, the process enters the second transition 408 for another attempt.

If the third decision block 422 determines that the smallest fragmented file will not fit into the largest contiguous free block region, a hold fragments block 428 updates the meta data and the process enters the second transition 408 for another attempt. By iterating through this process all of the fragmented files will moved into contiguous files on the disk. If at any time during the defragmentation process the host system 108, requests access to data on the instance of the storage disk 104, that is being processed, the data will be accessed from the buffer 202, or from the storage disk 104. If the access creates additional fragmented files segments, they will be defragmented in a following iteration of the defragmentation process. In some configurations, this defragmentation process can run continuously in the background, maintaining peak performance of the disk drive storage system 102, without host system 108 intervention.

Figure 5A:
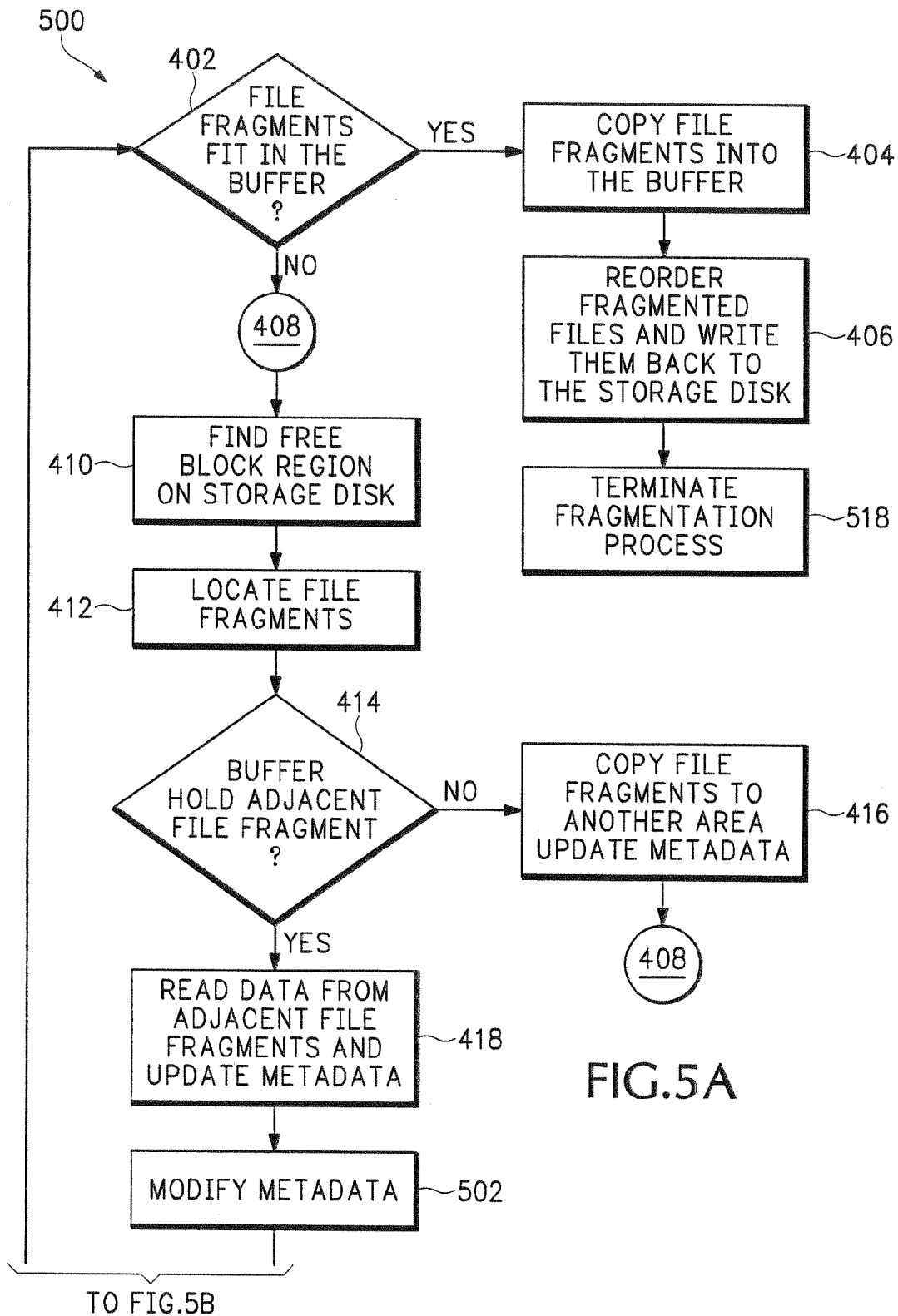
FIGS. 5A-5B are a flow chart depicting another defragmentation process, in an alternative embodiment of the present invention.
Figure 5B:
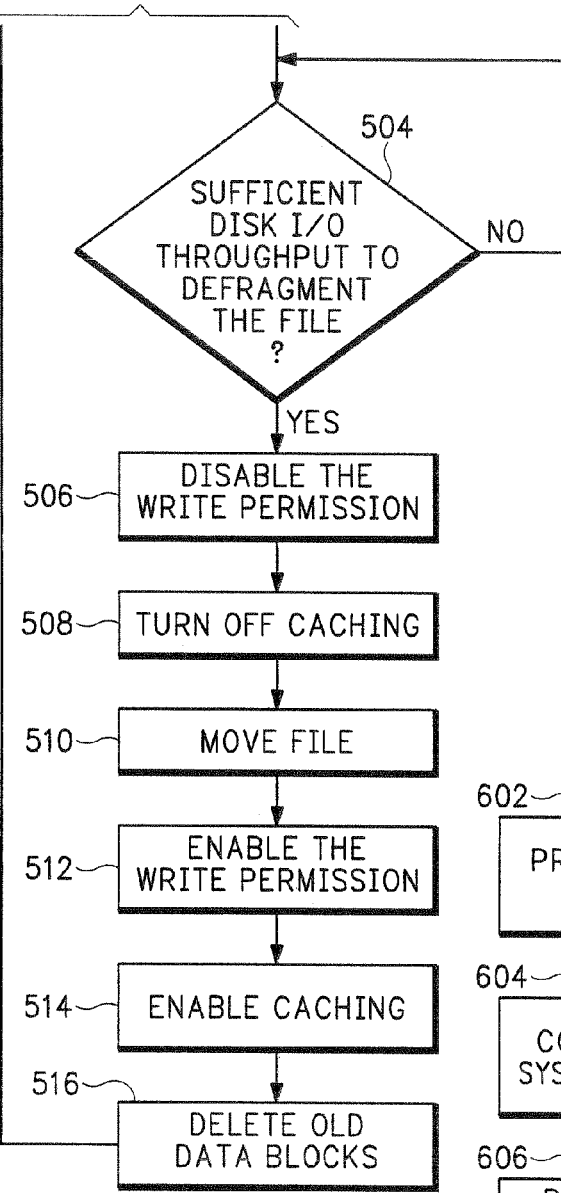

Referring now to FIGS. 5A-5B, therein is shown another flowchart 500 depicting another defragmentation process, in an alternative embodiment of the present invention. The other flowchart 500 depicts the logical process flow used by the cache manager 204, of FIG.2. Similarly the first decisions block 402 tests the meta data to determine whether all the file fragments on the storage disk 104, of FIG. 1, will fit in the buffer 202, of FIG. 2. If all the file fragments will fit in the buffer 202, the copy block 404 performs the copy of all the file fragments into the buffer 202. The restore block 406 reorders the fragmented files and writes them back to the storage disk 104, of FIG. 1, in contiguous data blocks and updates the meta data. At the completion of the restore block 406, an alternative end block 518 terminates the defragmentation process.

If the first decision block 402 determines that all of the file fragments will not fit in the buffer 202, the second transition 408 takes the process to the find free block 410. The find free block 410 examines the meta data to locate a largest contiguous free block region on the storage disk 104. Having found the largest contiguous free block, the process moves to the adjacent fragments block 412 locates file fragments that are adjacent to the previously identified free block region. The second decision block 414 tests to determine whether the buffer 202, can hold all of the adjacent file fragments. If the buffer 202, can not hold the identified adjacent file fragments, the move file fragments block 416 copies the file fragments to another area of free blocks on the storage disk 104, and updates the meta data. At the completion of the move file fragments block 416, the process enters the second transition 408 for another attempt.

If the buffer 202, can hold all of the adjacent file fragments, the move to buffer block 418 reads the data from the adjacent file fragments into the buffer 202 and frees the data blocks that held the adjacent file fragments and updates the meta data, thus increasing the size of the largest contiguous free block region. A redirect block 502 modifies the meta data so that the data blocks held in the buffer 202, are treated as part of the file system, with write and read permissions. In this state any transaction with the effected files will be made to the buffer 202. An activity check 504 checks to see if there is sufficient disk I/O throughput to defragment the file. If there is not sufficient disk I/O throughput then the buffer 202, remains the primary source of the data and the system continues to check for available disk I/O throughput. If there is available disk I/O throughput available the process moves to a disable write buffer block 506. The disable write buffer block 506 disables the write permission on the file held in the buffer 202. The file is still accessible for read, but is not available for modification.

A disable cache block 508 turns off the caching algorithm so that the file will remain in tact during the relocation to the storage disk 104. A restore file block 510 moves the file from the buffer 202, to an area of the storage disk 104, that has sufficient free data blocks to hold the file in contiguous blocks. An enable write buffer block 512 enables the write permission on the file in the buffer 202. An enable cache block 514 enables the caching algorithm and a free storage block 516 deletes the old data blocks, from the files original fragmented blocks, freeing them for further use. Then the process returns to the first decision block 402 in order to find the next file to defragment.

Figure 6:
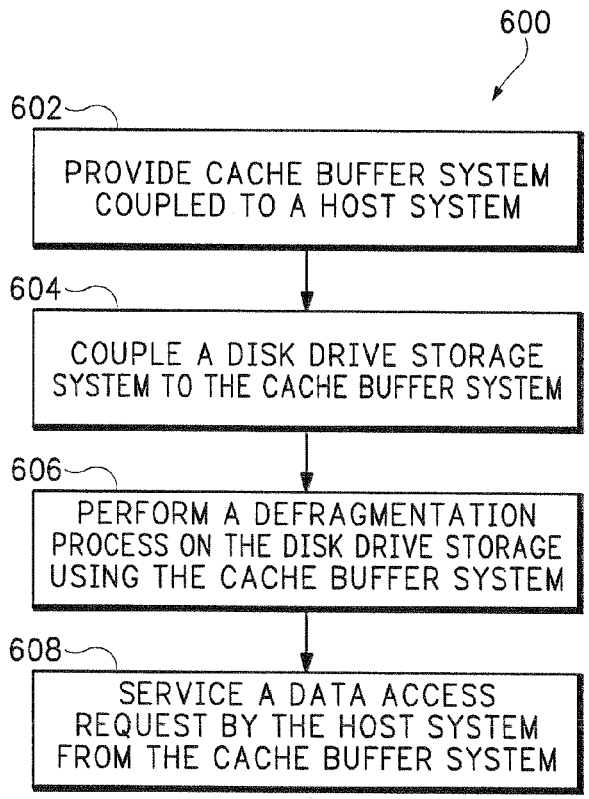
FIG. 6 is a flow chart of a system for disk drive storage defragmentation system in an embodiment of the present invention.

Referring now to FIG. 6, therein is shown a flow chart of a system 600 for disk drive storage defragmentation system 100 in an embodiment of the present invention. The system 600 includes providing a cache buffer system coupled to a host system in a block 602; coupling a disk drive storage system to the cache buffer system in a block 604; performing a defragmantation process on the disk drive storage system utilizing the cache buffer system in a block 606; and servicing a data access request by the host system from the cache buffer system in a block 608.

In greater detail, a method to provide a disk drive storage defragmentation system 100, in an embodiment of the present invention, is performed as follows:

1. Providing a cache buffer system coupled to a host system, wherein the cache buffer system is an extension of the file system structure. (FIG. 1)
2. Coupling a disk drive storage system to the cache buffer system, further comprises reducing fragmentation of a storage disk. (FIG. 1)
3. Performing a defragmantation process on the disk drive storage system utilizing the cache buffer system in a background operation. (FIG. 1)
4. Servicing a data access request by the host system from the cache buffer system. (FIG. 1)

It has been discovered that disk drive storage defragmentation system can enhance the performance of the disk drive storage system in normal operation. The features that reduce fragmentation allow the access of files to be performed in the fastest possible time. It has been discovered that the present invention thus has numerous aspects. An aspect is that the present invention a background defragmentation process can run without additional overhead for the host system. Another aspect is that the host system can access all files during the defragmentation process without reduced performance. These and other valuable aspects of the present invention consequently further the state of the technology to at least the next level.

Thus, it has been discovered that the disk drive storage defragmentation system method and apparatus of the present invention furnish important and heretofore unknown and unavailable solutions, capabilities, and functional aspects for preserving disk drive system performance. The resulting processes and configurations are straightforward, cost-effective, uncomplicated, highly versatile and effective, can be implemented by adapting known technologies, and are thus readily suited for efficiently and economically manufacturing devices that are fully compatible with conventional manufacturing processes and technologies.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the scope of the included claims. All matters hithertofore set forth herein or shown in the accompanying drawings are to be interpreted in an illustrative and non-limiting sense.

For cases when the data must be protected, while the fragments are copied into the cache buffer and being relocated, the old fragments can not be deleted before the fragments are reassembled on a different contiguous location on the disk storage. If a file is considered to be highly fragmented but the storage can not accept the additional I/O load of defragmentation, the file fragments remain on the disk storage while a copy of it is being accessed from the cache buffer. This is clearly acceptable for read purposes and should be considered as an important aspect of the current invention since it improves read performance during defragmentation process.

For write request, the first time only the buffered copy gets written to first, creating an incoherent cached copy relative to the copy on disk. In this case, if data protection is required for content in buffer, the cached data copy may be copied back to the disk storage before the write request is confirmed successful.

The invention claimed is:

1. A method, comprising:
providing a cache buffer system coupled to a host system;
coupling a disk drive storage system to the cache buffer system;
performing a defragmentation process on the disk drive storage system utilizing the cache buffer system; and
servicing a data access request by the host system from the cache buffer system;
wherein the cache buffer system is an extension of a file system structure.

2. The method of claim 1, further comprising utilizing meta data by a cache manager to perform the defragmentation process to minimize the data movement to and from the disk drive storage system.

3. The method of claim 1, further comprising:
providing a cache manager in the cache buffer system;
providing a write controller coupled to the cache manager;
providing a read controller coupled to the cache manager;
coupling a buffer to the cache manager; and
providing a meta data receiver coupled to the cache manager, to update physical location information of all files in the disk drive storage system.

4. The method of claim 1, further comprising pausing of the file defragmentation process if a data access request arrives from the host system.

5. The method of claim 1, wherein utilizing the cache buffer system during the defragmentation process comprises servicing data access requests by the host system from the cache buffer system.

6. A method, comprising:
providing a cache buffer system coupled to a host system, wherein the cache buffer system is an extension of a file system structure;
coupling a disk drive storage system to the cache buffer system;
performing a defragmentation process on the disk drive storage system utilizing the cache buffer system in a background operation; and
servicing a data access request by the host system from the cache buffer system.

7. The method of claim 6, further comprising utilizing meta data by a cache manager to perform the defragmentation process.

8. The method of claim 6, further comprising:
providing a cache manager in the cache buffer system to manage the fragmentation of the storage disk;
providing a write controller, coupled to the cache manager, to defer a write of a fragmented file;
providing a read controller, coupled to the cache manager, to flag a fragmented file for writeback;
coupling a buffer to the cache manager, wherein the buffer comprises an array of RAM to accommodate entirely the smallest media file stored in the disk drive storage system; and
providing a meta data receiver to update physical location information on all files in the disk drive storage system.

9. The method of claim 6, further comprising pausing of the file defragmentation process if a data access request arrives from the host system.

10. The method of claim 6 wherein utilizing the cache buffer system during the defragmentation process, comprises servicing data access requests by the host system.

11. A disk drive storage defragmentation system, comprising:
a host system;
a disk drive storage system;
a cache buffer system coupled between the host system and the disk drive storage system, wherein the cache buffer system defragments the disk drive storage system and services data access request by the host system; and
an extension of the file system structure utilizing the cache buffer system.

12. The system as claimed in claim 11, further comprising meta data utilized by a cache manager to perform the defragmentation process to minimize the data movement to and from the disk drive storage system.

13. The system as claimed in claim 11, further comprising:
a cache manager in the cache buffer system;
a write controller coupled to the cache manager;
a read controller coupled to the cache manager;
a buffer coupled to the cache manager, wherein the buffer accommodates the smallest media file stored in the disk drive storage system; and
a meta data receiver to update physical location information on all files in the disk drive storage system.

14. The system as claimed in claim 11, further comprises a data access request from host system, wherein the data access request pauses the file defragmentation process.

15. The system as claimed in claim 11, wherein data access requests by the host system during the defragmentation process are serviced by the cache buffer system.

16. The system as claimed in claim 11, further comprising meta data utilized by the cache manager to perform the defragmentation process and minimize the data movement to and from the disk drive storage system.

17. The claim as claimed in claim 11, further comprising:
a cache manager in the cache buffer system to manage the fragmentation of the storage disk;
a write controller, coupled between the cache manager and a meta data receiver, to control write operations including write data operations and to defer a write operation of a fragmented file;
a read controller, coupled between the cache manager and the meta data receiver, to control read operations including read data operations and to flag a fragmented file for writeback;
a buffer, coupled to the cache manager, including an array of RAM to accommodate entirely the smallest media file stored in the disk drive storage system; and
a meta data receiver, coupled between the cache manager, the write controller, and the read controller, to update physical location information of all files in the disk drive storage system.

18. The system as claimed in claim 11, further comprises a data access request from the host system, wherein the data access request pauses the file defragmentation process.

19. The system as claimed in claim 11, wherein the cache buffer system services data access requests by the host system during the defragmentation process.

* * * * *